(No Model.)

R. MAURIN.
PLANT CANE SHAVER.

No. 413,076. Patented Oct. 15, 1889.

Witnesses

Inventor
Robt. Maurin.

By his Attorneys
W. R. Stringfellow

UNITED STATES PATENT OFFICE.

ROBERT MAURIN, OF DONALDSONVILLE, LOUISIANA.

PLANT CANE-SHAVER.

SPECIFICATION forming part of Letters Patent No. 413,076, dated October 15, 1889.

Application filed May 7, 1889. Serial No. 309,878. (No model.)

*To all whom it may concern:*

Be it known that I, ROBERT MAURIN, a citizen of the United States, residing at Donaldsonville, in the parish of Assumption and State of Louisiana, have invented certain new and useful Improvements in a Plant Cane-Shaver; and I do declare the following to be a full, clear, and exact description of the invention, such as will enable others skilled in the art to which it appertains to make and use the same.

This invention relates to a plant cane-shaver, and the novelty will be fully understood from the following description and claim, when taken in connection with the annexed drawings, in which—

Figure 1:
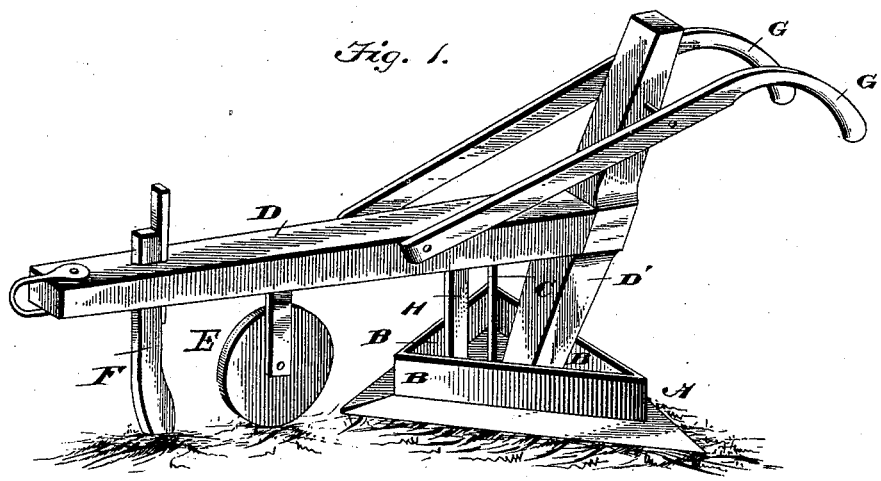
Figure 2:
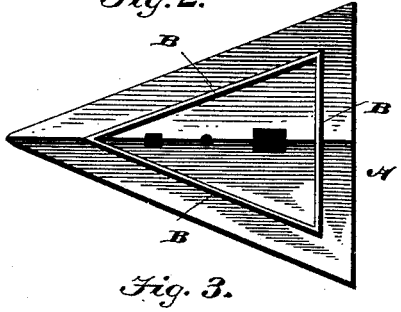
Figure 3:
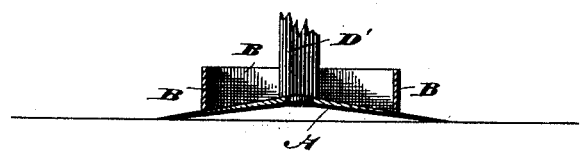
Figure 4:
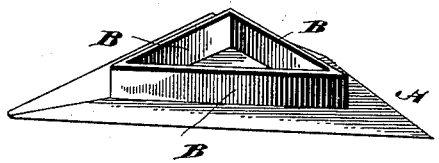

Figure 1 is a perspective view of my improved cane-shaver. Fig. 2 is a plan view of the horizontal cutter. Fig. 3 is a sectional detail view, and Fig. 4 is a perspective view of the cutter and shield.

Referring by letter to the said drawings, D indicates the draft-beam, of a form such as employed on ordinary plows, having a clevis at one end and suitable handles G at its opposite end. To the forward portion of the beam D is a cutter F, secured in its seat by a key and depending from the beam. In rear of this cutter is a roller E, arranged in advance of the triangular blade or cutter, which will be presently described.

A indicates the cutter, which is of a triangular form in outline and slightly concavo-convex in cross-section. This cutter is provided on its upper side with a shield or guard B, composed of three vertical branches united in a triangular manner, and surrounds the standard or braces.

D indicates the standard, which is secured at its lower end to the cutter and the rear wall of the shield, as shown, and is secured, about midway of its length, to the rear end of the draft-beam, its upper portion being secured by a round or cross-bar to the handle-beams.

H indicates an auxiliary standard, which connects the cutter with the beam in advance of the main standard, and C indicates a brace-rod which secures the cutter to the beam between the main and auxiliary standards.

Having described my invention, what I claim is—

In a cane-cutter, the triangular cutter A, concavo-convex transversely, as shown, in combination with the triangular shield B, having the three vertical sides or branches and secured to the upper convex side of the cutter at a distance from its marginal edges, the standard D', and the braces H and C, connecting the cutter and shield with the beam, and the whole secured to the cutter within the shield, substantially as specified.

In testimony whereof I affix my signature in presence of two witnesses.

ROBERT MAURIN.

Witnesses:
 JOS. DUGAS,
 EDWARD MAURIN.